US007383699B2

(12) United States Patent
Hockman

(10) Patent No.: US 7,383,699 B2
(45) Date of Patent: Jun. 10, 2008

(54) METHOD OF MANUFACTURING GLASS AND COMPOSITIONS THEREFORE

(75) Inventor: John Albert Hockman, Bath, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 458 days.

(21) Appl. No.: 10/493,902

(22) PCT Filed: Dec. 27, 2001

(86) PCT No.: PCT/US01/49926

§ 371 (c)(1),
(2), (4) Date: Apr. 27, 2004

(87) PCT Pub. No.: WO03/057636

PCT Pub. Date: Jul. 17, 2003

(65) Prior Publication Data

US 2004/0204304 A1 Oct. 14, 2004

(51) Int. Cl.
*C03B 3/00* (2006.01)
*C01B 33/26* (2006.01)

(52) U.S. Cl. .................. 65/135.9; 65/29.16; 106/600; 106/612; 501/27; 501/29

(58) Field of Classification Search ........... 501/27, 501/29, 31, 55, 72; 65/29.16, 135.9; 106/600, 106/612, 636
See application file for complete search history.

(56) References Cited

U.S. PATENT DOCUMENTS

| 3,082,102 A | 3/1963 | Cole et al. |
| 3,381,064 A | 4/1968 | Yamaguchi |
| 3,458,331 A | 7/1969 | Kroyer |
| 3,520,705 A | 7/1970 | Shido et al. |
| 3,682,666 A | 8/1972 | Lacourrege |
| 3,802,901 A | 4/1974 | Robertson et al. |
| 3,817,776 A | 6/1974 | Gringas |
| 3,875,288 A | 4/1975 | Hoffman et al. |
| 3,883,364 A | 5/1975 | Robertson et al. |
| 3,926,647 A | 12/1975 | Wuhrer |

(Continued)

FOREIGN PATENT DOCUMENTS

DE 141 105 4/1980

(Continued)

OTHER PUBLICATIONS

"Glass", Kirk—Ohmer, Encyclopedia of Chemical Technology, 4th Edition 1994, vol. 12, pp. 555-569, 593-601.

(Continued)

*Primary Examiner*—Steven P. Griffin
*Assistant Examiner*—Russell J Kemmerle
(74) *Attorney, Agent, or Firm*—Leon Nigohosian, Jr.; Derek S. Jessen

(57) ABSTRACT

The present invention relates to the production of glass. In particular, the present invention relates to a method for the production of glass utilizing processes of reacting materials in a glass furnace in either a batch mode or a continuous process. These reactions affect the thermodynamics and other characteristics of the glass-forming reaction. The present invention additionally relates to compositions which are useful in such reactions.

12 Claims, 2 Drawing Sheets

U.S. PATENT DOCUMENTS

| | | | |
|---|---|---|---|
| 3,941,574 A | 3/1976 | Melkonian et al. |
| 3,956,446 A | 5/1976 | Eirich et al. |
| 3,967,943 A | 7/1976 | Seeley |
| 3,969,100 A | 7/1976 | Kuna et al. |
| 4,023,976 A | 5/1977 | Bauer et al. |
| 4,026,691 A | 5/1977 | Lovett et al. |
| 4,028,131 A | 6/1977 | Pons |
| 4,110,097 A | 8/1978 | Chevallier et al. |
| 4,238,217 A | 12/1980 | Stepanek et al. |
| 4,248,615 A | 2/1981 | Seng et al. |
| 4,252,754 A | 2/1981 | Nakaguchi |
| 4,300,879 A | 11/1981 | Goldmann et al. |
| 4,474,594 A | 10/1984 | Lazet |
| 4,519,814 A | 5/1985 | Demarest, Jr. |
| 4,539,030 A | 9/1985 | Demarest, Jr. et al. |
| 4,576,644 A | 3/1986 | Goldmann |
| 4,612,292 A | 9/1986 | Richard |
| 4,634,461 A | 1/1987 | Demarest, Jr. et al. |
| 4,920,080 A | 4/1990 | Demarest, Jr. |
| 5,004,706 A | 4/1991 | Dickinson |
| 5,100,840 A | 3/1992 | Urabe et al. |
| 5,422,320 A | 6/1995 | Adams, Jr. et al. |
| 5,900,052 A | 5/1999 | Nakajima et al. |
| 6,211,103 B1 | 4/2001 | Tomaino et al. |
| 6,271,159 B1 | 8/2001 | Fairchild et al. |
| 6,287,378 B1 | 9/2001 | Fairchild et al. |
| 6,287,997 B1 | 9/2001 | Fairchild et al. |
| 6,336,346 B2 | 1/2002 | Tomaino et al. |
| 6,358,870 B1 | 3/2002 | Szczesniewski et al. |
| 6,420,289 B1 | 7/2002 | Tomaino et al. |
| 6,531,421 B2 | 3/2003 | Hockman |
| 6,569,793 B2 | 5/2003 | Hockman et al. |
| 7,260,960 B2 | 8/2007 | Carty |
| 2002/0194873 A1 | 12/2002 | Hockman |
| 2002/0194882 A1 | 12/2002 | Hockman |
| 2006/0101855 A1 | 5/2006 | Pita-Sczcesniew |
| 2007/0021287 A1 | 1/2007 | Hockman et al. |

FOREIGN PATENT DOCUMENTS

| | | |
|---|---|---|
| DE | 42 28 500 | 9/1992 |
| FR | 1376473 | 3/1972 |
| JP | 53-139621 | 12/1978 |
| JP | 55 149122 | 5/1979 |
| JP | 59 64563 | 4/1984 |
| JP | 2 141454 | 5/1990 |
| JP | 09 285849 | 4/1997 |
| JP | 10 291852 | 11/1998 |
| SU | 644 731 | 1/1979 |
| SU | 823 285 | 4/1981 |
| SU | 981 217 | 12/1982 |
| SU | 340 257 | 5/1983 |

OTHER PUBLICATIONS

Mirkovich, V.V.; "Utilization od Diopside in the Manufacture of Glass," *Mines Branch Technical Bulletin TB 192*; Dept. of Energy, Mines and Resources (Ottawa, Canada 1974).

Mirkovich, V.V. et al; "Utilization of Diopside in the Manufacture of Glass, Part II"; *Journal of the Canadian Ceramic Society*; vol. 44, pp. 43-47; (1975).

Carty, William M. et al., Alfred University, "Selective Batching for Improved Commercial Glass Melting," Jul. 22, 2003, Award No. DE-PS36-02GO90014, Dept. of Energy, Washington.

METHOD OF MANUFACTURING GLASS AND COMPOSITIONS THEREFORE

FIELD OF THE INVENTION

The present invention relates to a product, a process for its preparation, and the use of such product in glass. More particularly, the present invention relates to a process that produces a solid state particle that is particularly useful in the production of glass products, such as flat glass, fiberglass, container glass, lighting glass, tableware, and the like.

BACKGROUND OF THE INVENTION

Processes, and materials for such processes, for the manufacture of glass have millenniums of development. In particular, glass manufacturers have been, and continue to be, concerned with the components, thermodynamics and other characteristics of the glass-making reactions in glass furnaces. The glass reaction generally involves the reaction of materials to produce a composition containing the reacted and/or dispersed components of silica (silicon dioxide from sand, quartz and the like), soda ash (sodium carbonate), and lime (calcium oxide from quicklime, hydrated lime and the like) with other optional components, generally metal oxides of lead, lithium, cerium, iron, magnesium, potassium, barium, borax and the like.

Various considerations have addressed such processes by varying the feed materials and the process schemes for the reaction of such compositions. Such considerations include, for example, reaction of a portion of the materials before creating a total glass batch. For example, one scheme is pretreatment of the batch constituents by calcining the limestone and/or dolomite constituents so as to decompose the carbonates to oxides. This calcining releases carbon dioxide from the material added to make the total glass batch. This elimination of carbon dioxide before melting begins is advantageous since it reduces the entrapping of gaseous inclusions in the glass. Other schemes involve using various components to attempt to effect the reaction's thermodynamics or quality or yield results. While advances have been made, there still exists the need for developing processes and feed materials to improve the glass-making processes.

RELATED ART

In U.S. Pat. No. 3,082,102, heating of the batch mixture is performed prior to melting to effect reaction between silica and soda ash to produce sodium metasilicate. The temperature is limited to 820.degrees Centigrade for soda-lime-silica glass to avoid producing a molten phase that would lead to clogging of the preliminary heating apparatus.

In U.S. Pat. No. 3,682,666, a similar process of reacting the whole batch mixture to produce silicates prior to melting is disclosed in which a lowered reaction temperature between 600.degrees Centigrade and 787.degrees Centigrade. Such is made possible by the inclusion of a small amount of halide.

In U.S. Pat. No. 3,817,776, a process is disclosed to partially react preheated sand grains to sodium silicate by contact with molten caustic soda. The remainder of the batch ingredients are added subsequently. This process has the disadvantage of requiring the use of caustic soda, which is more costly than soda ash as a source of sodium for making glass. Also, the process of contacting solids with molten material is more difficult to control and more prone to plugging than a solid state reaction.

In U.S. Pat. No. 3,883,364, glass furnace dusting problems are reduced by providing a process for sintering alkaline earth carbonate to be charged to a glass furnace.

In U.S. Pat. No. 4,248,615, an energy conserving glass manufacturing process is provided in which agglomerants are preconditioned prior to supplying them to a verticle bed for glass manufacturing.

In U.S. Pat. No. 4,539,030, an example of a calcining pretreatment is disclosed. Calcining requires temperatures in excess of 1600 degrees Fahrenheit (870 degrees Centigrade), which precludes treatment of the whole batch mixture because such temperatures would cause fusion of other constituents of the batch, particularly the soda ash or other soda source.

In U.S. Pat. No. 4,920,080, silica is reacted with sodium carbonate to form sodium silicate in as a preliminary step in a glass melting process. The method preferably calcines calcium carbonate-containing batch materials separately before combining with sodium silicate as liquefying is initiated. The process materials are preheated and pre-reacted in two separate portions to optimize prior to initiation of melting.

In U.S. Pat. No. 5,004,706, a process is provided to address problems of stickiness of glass batches by pre-reaction of a portion of the glass batch.

SUMMARY OF THE INVENTION

The present invention discloses a process that includes preferentially reacting a portion of a glass batch within the total glass batch. This preferential reaction is accomplished by reacting a solid state particle containing a portion of the total glass batch thus effectively creating an inhomogeneity in the total glass batch. The components reacted in this preferential reaction are exothermic in nature and effectively lower the eutectic character of the total glass batch.

The present invention further discloses a solid state particle comprising silicon, calcium and magnesium that creates an inhomogeneity within the total glass batch. The solid state particle produced according to the process of the present invention is useful in the production of glass products, such as flat glass.

The present invention further discloses a glass composition comprising silica, soda ash, lime or limestone, a solid state particle containing silicon dioxide, calcium hydroxide, magnesium oxide, and magnesium hydroxide, and other optional metal oxides.

The solid state particle of the present invention is particularly useful in production of glass product such as flat glass, fiberglass, container glass, lighting glass, tableware, and the like.

DESCRIPTION OF THE FIGURES

FIG. 1 shows the unreacted silica (stones) per pound of glass as a function of dwell time at a hold temperature of 1400 Centigrade. The control glass without the invention requires a longer dwell time to reach a point without significant stones compared to the invention (glass batch with the solid state particle). The dwell time relates to the melting rate of the glass, which in turn effects the throughput

FIG. 2 shows the energy evolved or absorbed as a function of temperature for a control glass red) and a glass using the solid state particle. The temperatures between 900 Centigrade and 1100 Centigrade show the calcium magnesium silicate reaction in the experimental glass. This reaction is clearly exothermic in nature (compared to the baseline). The control glass without agglomeration of the solid state particle shows an endothermic reaction, typical of most glass reactions in this regime. In total, the graph shows the evidence of a calcium magnesium silicate phase that would not exist in the glass if not for the present invention. This calcium magnesium silicate not only helps the melting rate as in FIG. 1, but also imbues energy into the total glass batch due to the exothermic nature of the reaction.

DETAILED DESCRIPTION OF THE INVENTION

Figure 1:
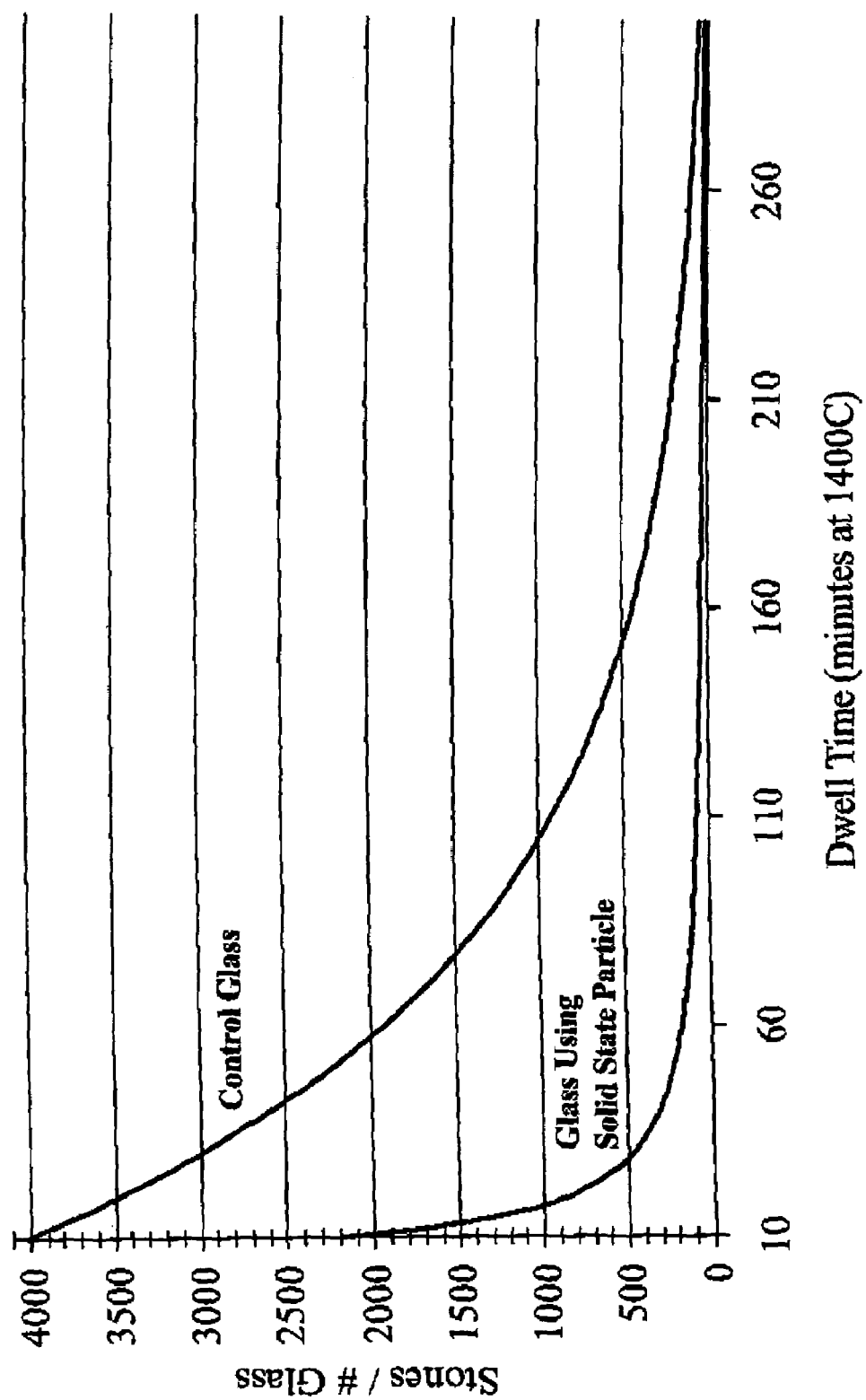
FIG. 1—Solid State Particle in Float Glass
Figure 2:
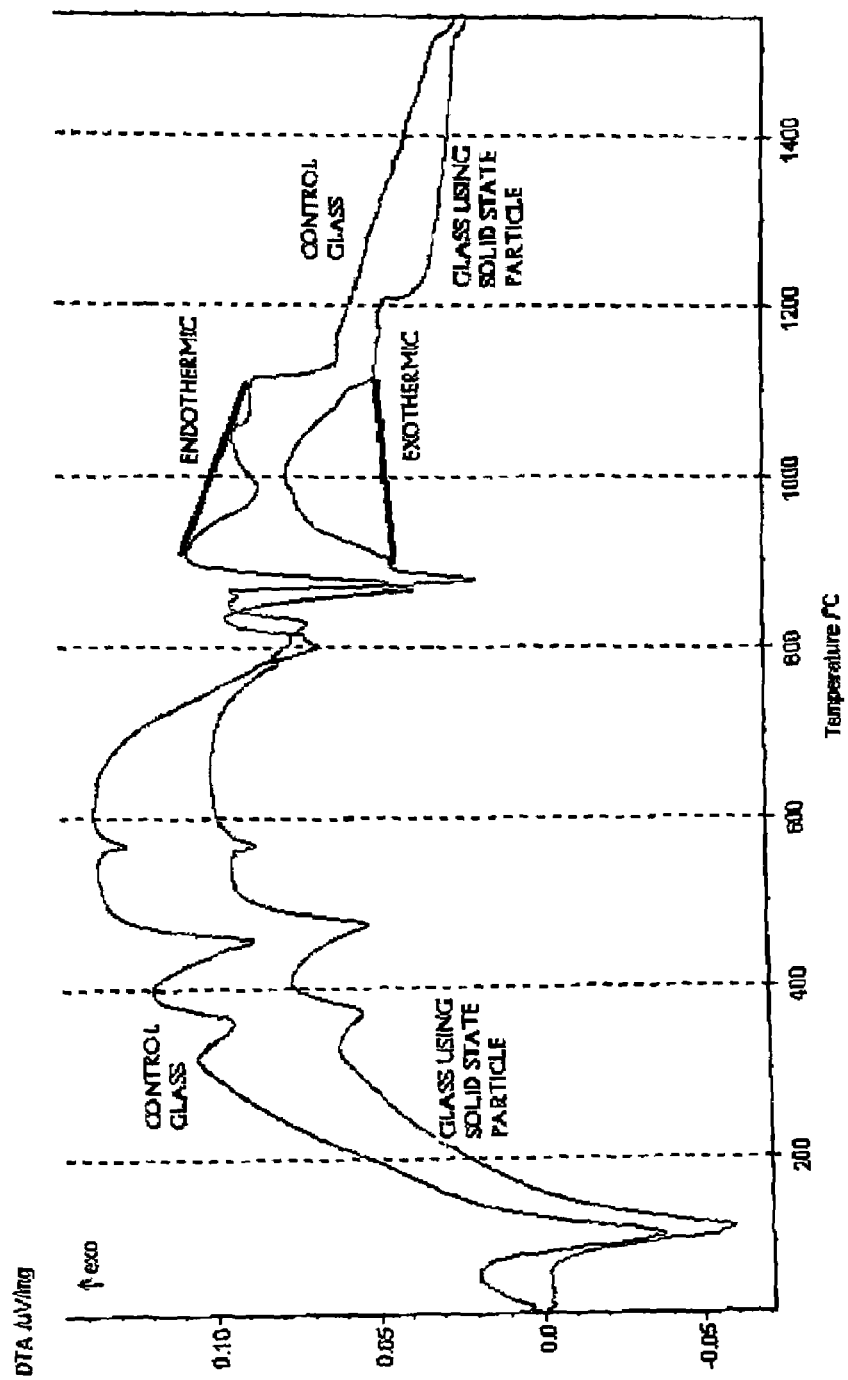
FIG. 2—Differential Thermal Analysis

One embodiment of the present invention is a process that includes preferentially reacting a portion of a glass batch within the total glass batch. This preferential reaction is accomplished by reacting a solid state particle containing a portion of the total glass batch thus effectively creating an inhomogeniety in the total glass batch. The components reacted in this preferential reaction are exothermic in nature and effectively lower the eutectic character of the glass batch compared to that eutectic character present without such selection. "Eutectic character" of a glass batch is defined as the temperature needed by two or more batch components in physical contact with each other to drive the glass-forming reactions as well as the path of the reaction and the impact of such on the reaction kinetics and speed. "Solid state particle" refers to a mixture of compounds such as silicon dioxide, calcium hydroxide, magnesium oxide, and magnesium hydroxide that, when heated, will initiate a solid state reaction within the particle that concludes with the production of a new compound such as calcium magnesium silicate.

In a preferred embodiment of the present invention, the solid state particle, comprising components of silicon dioxide, calcium oxide and magnesium oxide materials, creates an inhomogeniety and is located within the glass batch. The relative amount of these three components is effective to produce an exothermic reaction when heated to a reaction initiation temperature. This solid state particle is admixed with a mass containing a balance of other glass-forming materials prior to the exothermic reaction. Such other glass-forming materials may contain sodium materials and additional silicon materials as well as various other materials needed to produce the desired glass composition.

The silicon material of the solid state particle is silicon dioxide, and, more preferably, a silica flour. Preferred sources of such include sand, silica flour, nepheline syenite, and spodumene. Preferably the silicon material particle size is 90% less than 0.0075 Centimeters to promote a thermodynamic advantage towards the solid state reaction versus the standard glass reaction.

The calcium material of the solid state particle is calcium oxide and, more preferably, a calcium hydroxide. Preferred sources of such include dolomite lime, dolomitic limestone, calcite, lime, colemanite, natural diopside and wollastonite, ulexite, gypsum, fluorspar, aragonite, and feldspar. Preferably the calcium material particle size is 90% less than 0.0075 Centimeters to promote a thermodynamic advantage towards the solid state reaction versus the standard glass reaction.

The magnesium material of the solid state particle is magnesium oxide and, more preferably, a magnesium hydroxide. Preferred sources of such include dolomitic lime, dolomitic limestone, natural diopside, brucite, periclase, and epsom salt. Preferably the magnesium material particle size is 90% less than 0.0075 Centimeters to promote a thermodynamic advantage towards the solid state reaction versus the standard glass reaction.

The components of the solid state particle, the silicon material, calcium material and magnesium material are in the respective molar ratios of from about zero (0) part to about one (1) part calcium oxide and from about zero (0) part to about one (1) part magnesium oxide with respect to one (1) part silicon dioxide.

More preferably, the components of the solid state particle, the silicon material, the calcium material and the magnesium material are in the respective weight ratios of from about 0.4 parts to about 0.6 parts calcium oxide and from about 0.3 parts to about 0.4 parts magnesium oxide to one (1) part silicon dioxide.

The solid state particle size should be of a magnitude that promotes the attainment and retention of a homogenous distribution of material in the glass batch during the glass reaction. Accordingly, the solid state particle size should be of a similar magnitude of the other glass batch components, more preferably of the silicon source material, e.g. sand, used in the total glass batch. Particularly, the median size of the solid state particle material should be from about 75 percent to about 500 percent of the median size of the balancing silicon dioxide material used to produce the glass batch, even more particularly from about 85 percent to about 115 percent of the median size of the balancing silicon dioxide material.

A preferred solid state particle material is an agglomerate of minerals produced by the admixture of calcium oxide material, magnesium oxide material, silicon dioxide and water. The agglomerate is formed to a particle size which approximates the sand balance to be used in the glass batch, preferably from about 0.018 centimeters to about 0.14 centimeters, more preferably, from about 0.025 centimeters to about 0.085 centimeters.

The product of the reacted solid state particle, that occurs within the total glass batch, can be a calcium magnesium silicate having an empirical formula of $(CaO)_x(MgO)_y(SiO_2)_z$, wherein the weight values of x and y relative to the amount of silica is sufficient to produce an exothermic reaction. Preferably, x, y, and z have the respective ranges from about zero (0) to about three (3), from about zero (0) to about one (1), and from about one (1) to about two (2). The formed calcium magnesium silicate product and the other material in the glass batch react as a total glass batch system to produce the desired glass product. Additional energy to drive the glass-forming reaction to completion is provided to the glass batch system. Preferably, the exothermic reaction provides from about 5 percent to about 20 percent of the total energy needed to perform the total glass batch reactions to produce the desired glass product.

The following examples are intended to illustrate the present invention, but not to limit the scope of protection afforded by the claims hereafter:

EXAMPLE 1

A glass product is to have components of silicon, sodium, calcium, magnesium, measurable in equivalents as silica dioxide ($SiO_2$), sodium oxide ($Na_2O$), calcium oxide (CaO), and magnesium oxide (MgO). To supply the silicon component of the glass, a sand material is selected as a feed material. The sand has a size measurement of 30 mesh to 140 mesh. To supply the calcium and magnesium components to the glass batch, the solid state particle containing the magnesium, silica, and calcium components, agglomerated with water, dried, and screened, is added to the total glass batch. The agglomerated (solid state) particles contain silicon dioxide ($SiO_2$), hydrated calcium oxide ($Ca(OH)_2$), hydrated magnesium oxide ($Mg(OH)_2$), periclase (MgO), and water. This agglomerated particle material is combined with the sand to be used in an amount to complete the total silicon value of the glass batch. Soda ash is added to supply the sodium value for the glass. Since the agglomerated particle does not contain sufficient calcium value for the glass formula, limestone will be used. The total glass batch is heated to a temperature below the glass reaction temperature but sufficient to initiate an exothermic reaction in the agglomerated particles.

The exothermic reaction begins the production of calcium magnesium silicate material in the total glass batch. The temperature of the total glass batch continues to rise due to the supplied heat and the exothermic reaction heat to produce a glass reaction involving the calcium magnesium silicate material, sand, limestone, and soda ash. The exothermic reaction and glass reaction occur simultaneously for a period within the glass batch vessel until all reactions are completed producing a glass.

What is claimed is:

1. A process for producing a glass, the process comprising:
   (a) admixing a calcium material, a magnesium material, and a silicon material with water, producing a solid state particle agglomerate thereby;
   (b) admixing the solid state particle agglomerate with at least one glass-forming material comprising a source of silicon dioxide in a glass furnace producing a total glass batch thereby;
   (c) heating the total glass batch to a reaction initiation temperature such that the heating initiates an exothermic solid state reaction in the solid state particle agglomerate and the solid state reaction concludes with the production of a calcium magnesium silicate material; and
   (d) providing continued heating of the total glass batch to provide additional energy that, with energy supplied by the exothermic solid state reaction, raises the temperature of the total glass batch to produce a glass thereby.

2. The process of claim 1 wherein the agglomerate is a solid state particle having an average size of from about 0.018 centimeters to about 0.14 centimeters.

3. The process of claim 1 wherein the silicon material, the calcium material and the magnesium material are in the respective weight portions of from about zero (0) parts to about one (1) part calcium material and from about zero (0) parts to about one (1) part magnesium material to one (1) part silicon material.

4. The process of claim 1 wherein the silicon material, the calcium material and the magnesium material are into respective weight portions of from about 0.4 parts to about 0.6 parts calcium material and from about 0.3 parts to about 0.4 parts magnesium material to one (1) part silicon material.

5. The process of claim 1 wherein the silicon material is selected from the group consisting of silicon dioxide, silica flour, sand, nephtheline syenite and spodumene.

6. The process of claim 1 wherein the silicon material particle size is 90 percent less than 0.0075 centimeters.

7. The process of claim 1 wherein the calcium material is selected from the group consisting of calcium oxide, calcium hydroxide, dolomitic lime, dolomitic limestone, calcite, lime, colemanite, natural diopside, natural wollastonite, ulexite, gypsum, fluorspar, aragonite and feldspar.

8. The process of claim 1 wherein the calcium material particle size is 90 percent less than 0.0075 centimeters.

9. The process of claim 1 wherein the magnesium material comprises at least one of magnesium oxide and magnesium hydroxide.

10. The process of claim 1 wherein the magnesium material is selected from the group consisting of magnesium oxide, magnesium hydroxide, dolomitic lime, dolomitic limestone, calcite, lime, colemanite, natural diopside, brucite, periclase and epsom salt.

11. The process of claim 1 wherein the magnesium material particle size is 90 percent less than 0.0075 centimeters.

12. The process of claim 1 wherein the calcium material includes calcium hydroxide, the magnesium material includes magnesium oxide and magnesium hydroxide, and the silicon material includes silicon dioxide.

* * * * *